Nov. 17, 1931.  L. GILLETT  1,832,482
PROCESS FOR REGULATING THE TEMPERATURE OF GASES CONTAINING SO₃ OR H₂SO₄
Filed March 29, 1926
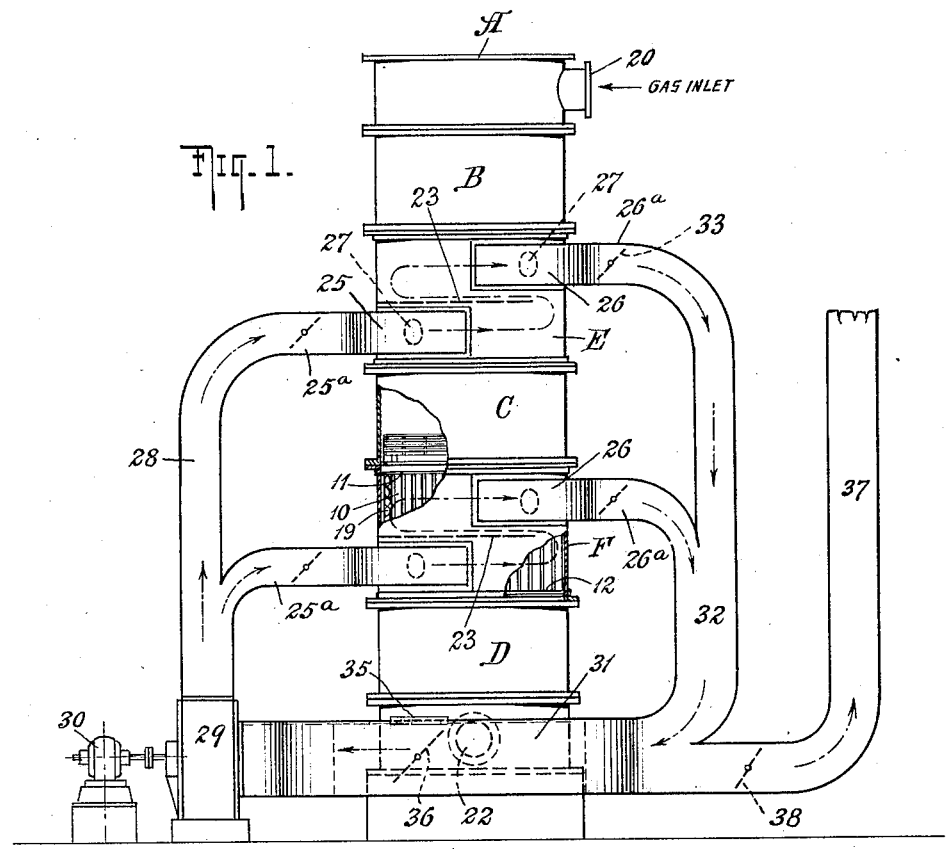
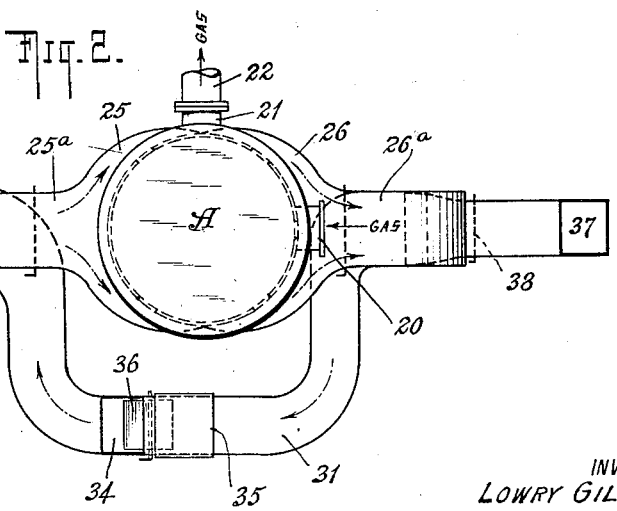
WITNESS
INVENTOR
LOWRY GILLETT
BY
ATTORNEY Patented Nov. 17, 1931

1,832,482

UNITED STATES PATENT OFFICE

LOWRY GILLETT, OF SYOSSETT, NEW YORK, ASSIGNOR TO GENERAL CHEMICAL COMPANY, OF NEW YORK, N. Y., A CORPORATION OF NEW YORK

PROCESS FOR REGULATING THE TEMPERATURE OF GASES CONTAINING $SO_3$ OR $H_2SO_4$

Application filed March 29, 1926. Serial No. 98,162.

This invention relates to a method and means for regulating the temperature of gases containing sulphur trioxide or sulphuric acid, particularly to such gases as are employed in the manufacture of sulphuric acid. The principal object of my invention is to prevent the formation or condensation of sulphuric acid on the walls or other surfaces of the heat exchangers or transferrers employed in dry cooling the gases in the above mentioned process, which condensation results in the destruction of the apparatus and contamination of the catalyst. Another object of my invention is the provision of an improved method of cooling, and apparatus therefor, whereby increased efficiency in the cooling operation is obtained over those systems proposed heretofore for the elimination of the above mentioned condensation of corrosive acid.

In the treatment of gases containing sulphur trioxide generally, it is of course highly desirable to prevent the condensation of sulphuric acid, which will cause corrosion. This is particularly true when subjecting the gas to dry cooling in contact with a cooling surface or heat transfer wall corrodible by sulfuric acid, as occurs in the pipe lines, coolers, and heat exchangers of the system. Acid which has been once condensed does not vaporize again until the temperature is subsequently raised considerably above that at which it will initially condense. The condensed acid collects at points in the system, corrodes the equipment, particularly if steel, forming sulphates as iron sulphates, which may later become powdered and be carried along in the gas stream into the catalyst chambers, resulting in contamination of the catalyst and loss of conversion efficiency. Moreover, as iron sulphate is a relatively poor conductor of heat, any sulphate which forms on the heat transfer surfaces, and is retained there, will form an insulating layer and prevent the efficient exchange of heat through the said surfaces. By operating in accordance with my invention, this objectionable condensation is effectively prevented and a heat transfer efficiency obtained much greater than that which has been considered possible heretofore when operating under conditions such that no corrosion is obtained.

The objectionable presence of condensed acid in sulphuric acid systems has been long recognized and methods have been devised to prevent the formation of such condensed acid. It has been considered necessary in the past to maintain the temperature of gases in systems containing sulphur trioxide above about 400° F. in order to eliminate the possibility of condensation of sulphuric acid. This condition has been considered to be necessary irrespective of the composition and moisture content of the gases to be cooled, and corrosion has been found to result whenever this precaution was not observed. I have discovered that while this condition is true in some cases, corrosion will not always be obtained, even if the temperature of the gases is lowered to below 400° F., provided certain conditions, referred to later, are maintained.

It has been proposed to maintain the temperature of the gases undergoing cooling above that value at which it was thought that condensation of sulphuric acid from the gases would first commence, i. e., about 400° F., by the use of a cooling medium preheated to this temperature. This of course means that in many cases, an efficient heat transfer could not be obtained, as compared with the use of a cooling medium having a lower temperature. I have discovered reasons why this high temperature was considered necessary and have devised a method and apparatus whereby in many instances a more efficient heat transfer and desired temperature conditions may be obtained without resulting corrosive action upon the equipment.

Other objects will appear from the following description, and by reference to the accompanying drawings, forming a part hereof, and wherein a satisfactory and typical example of an apparatus involving my invention is illustrated. In said drawings, Fig. 1 is a diagrammatic elevation partly in section of a converter-transferrer column, and Fig. 2 is a plan view of the structure shown in Fig. 1.

The converter-transferrer column A as shown consists of a number of superimposed sections or compartments, of which the uppermost section B and the lowermost section D as well as the middle compartment C constitute catalytic converters in which the catalytic material (such as platinized asbestos) is supported in any well-known or approved manner. Between the converter compartments B, C and D respectively are interposed compartments E and F respectively which contain heat-transferring or exchanging apparatus for the purpose of cooling the gases on their way from one converter section to the next. In the embodiment illustrated, each of the heat transferrers E and F of the same construction, although the transferrer F could be smaller because of the smaller amount of heat generated by the reactions within the converter section C, and as shown comprises a plurality of tubes 10 extending between and having their ends connected to the tube plates 11 and 12. Each of the tubes 10 preferably has mounted therein a helical baffle 19 to cause the gas passing through said tubes to flow with a whirling motion and thereby ensure contact of substantially all of the gas with the cylindrical cooling surfaces of the tubes. The gases to be treated in the column A, (for example a mixture containing from 7% to 12% of $SO_2$) are admitted through the inlet 20 at the top of the column and flow successively through the sections B, E, C, F and D, the sections B, C and D as heretofore pointed out, containing the catalytic material, the converter section D being provided with an outlet 21 through which the gases pass to the pipe 22 leading to the usual absorbers. The temperature of the gases entering the inlet 20 is approximately 750° F. and during this passage through the converter section B, the well-known exothermic reactions which take place therein result in increasing the temperature of the gases to about 1050° F. In passing through the heat transferrer E, the gases are cooled to the original admission temperature, a heating and cooling of the gases also occurring in the converter section C and transferrer F respectively. If cold air is admitted to the transferrers, the chilling of the walls of the tubes 10 results in the condensation and formation of sulphuric acid on such walls, which acid attacks and soon destroys the metal of the tubes thereby necessitating the frequent renewal of such tubes.

According to my invention the air, or other cooling medium used, is admitted to the transferrers at a temperature of from about 200 to 400° F., and the apparatus for supplying the cooling air is so constructed that the temperature of the air can be readily controlled to maintain it between the desired limits. For this purpose each of the transferrers has secured thereto the pipes 25 and 26 preferably constructed as bustle pipes which are secured to and extend substantially half way around the circumference of the compartment, the inlet pipe 25 being located at the bottom and the outlet pipe 26 at the top and upon the opposite side of the compartment. This construction provides a counter flow of the cooling medium which of course gives greater efficiency and is preferable to an arrangement in which the cooling medium and gas to be cooled, flow in the same direction. Communication between the pipes 25, 26 and the compartment E and F is established through a plurality of apertures 27 provided in the side wall of the column section and the flow of the air is counter to the gas flow in the tubes 10 in order to obtain the most efficient heat exchange, although of course this is not essential. Preferably, a baffle 23 is interposed between the apertures for the inlet and outlet pipes to also cause a transverse flow of the cooling air. The arrangement of the bustle pipes 25, 26 is the same for each of the heat transferrers E and F and the outer ends of the pipes 25 are connected by the branch pipes 25a to a vertical stand pipe 28 connected to the pressure side of a fan blower 29, or any other suitable blower, driven by any suitable means such as the motor 30. The suction side of the blower is connected by means of the suction pipes 31 and 32, and branches 26a with the outlet pipes 26. Each of the branch pipes 25a, 26a is provided with a damper 33 for regulating the air flow. Cold air is admitted to suction pipe 31 between its ends through an inlet 34, the opening of which is controlled by a shutter 35, and a damper 36 is located adjacent to said inlet to check the flow through said pipe 31. Air inlet 34 is preferably located between damper 36 and inlet of the blower. A purge pipe 37, controlled by a damper 38 and leading to any conveniently located discharge stack, is connected with the suction line between the bustle pipes 26 and the blower inlet.

It appears that when using undried air as a source of oxygen for the production of sulphur dioxide for use in a sulphuric acid system, the moisture content of the gases will frequently be in the neighborhood of 0.5 grams $H_2O$ per cu. ft. This moisture will combine with the sulphur trioxide often present in sulphur dioxide gases which have been produced by combustion of brimstone or pyrites, and if the temperature falls below about 400° F. will condense out and corrode the equipment. Likewise, when cooling the gas after it has passed through one or more of the converters and is almost wholly in the form of sulfur trioxide, condensation will occur if the temperature drops below 400° F. As in every case the amount of sulphuric acid formed will be over five times the amount by weight of excess moisture present in the system, and as the total amount of moisture introduced into the system is quite large owing to the large volume of air required, it can readily be seen that the problem presented is a serious one. It is common practice at present in the production of sulphuric acid to dry the air used for oxidation before admission into the system. However, it has still been considered necessary to maintain the temperature of the gases in the system above about 400° F. while in contact with corrodible metal surfaces in order to prevent corrosion of the equipment. I have discovered that a definite relation exists between the amount of moisture in the gases and the temperature to which they may be cooled before condensation of the sulphuric acid takes place. For instance, with gases produced from undried air and containing about 0.5 grs. of $H_2O$ per cu. ft., the temperature must be maintained above about 400° F. to prevent condensation. However, if the air used is comparatively dry, as is frequently the case in the winter, or is first dried to an extent such that its moisture content is down to between 0.05 and 0.1 gr. of $H_2O$ per cu. ft., I have found that the temperature may be dropped to about 300° F. before condensation will commence. If an $H_2O$ content of about 0.01 gr. $H_2O$ per cu. ft. is maintained, the temperature may be dropped to about 240° F. before condensation will commence. When using 98% sulphuric acid as a drying agent, by means of which moisture contents as low as .001 to .005 may be obtained, I have found that the temperature may be dropped to approximately 200° F. and still not obtain a corrosive action upon the equipment. It will be seen, therefore, that a definite relation exists between the amount of moisture in the gases and the temperature to which they may be cooled.

It will be appreciated that this discovery permits a much more efficient cooling of gases in the system than is possible when the cooling medium is maintained at a temperature above 400° F. The temperature differential between the hot gases and cooling medium will be increased, thus permitting a more rapid abstraction of heat. The volume of cooling medium required to be circulated through the system will be smaller due to its capacity to absorb a greater amount of heat. As the size of the blower or other means for circulating the cooling medium is directly proportional to the volume of gas handled, it will be seen that not only may the heat exchangers or coolers be reduced in size, but also the blower, thus materially reducing equipment charges.

In the past, even when the exit temperature from the heat transferrers of gases, containing sulphur trioxide, was maintained above 400° F., it was frequently found that corrosion occurred in the equipment. The explanation for this was difficult to see in that this temperature was frequently above the condensation temperature of sulphuric acid, even with a moisture content in the cooled gases corresponding to the use of undried air. I have concluded that the cause of this corrosion was the formation of sulphuric acid due to localized cooling of the heat transfer surface by the cooling medium at the points of entry of the cooling medium into the heat transferrers. This sulphuric acid when once formed, does not readily voltatilize again until the temperatures are later raised to a point considerably above the condensing temperature. Amounts of sulphuric acid would thus form at points in the heat transferrers, cause corrosion, and necessitate repair or removal of the entire unit. I have discovered that in order to prevent this localized cooling at the point of entry of cooling gases into the heat transfer system, such gases must be preheated to a temperature such that the heat transfer surfaces will not be below the condensation temperature of sulphuric acid for the particular moisture content of the said sulphur trioxide containing gases. This temperature, however, may still be far below that heretofore considered necessary, especially when operating with dried air as is now common practice. It will be observed that the essential element of my invention is not only to maintain the cooled gases at their point of exit from the heat transferrers above the condensation temperature of sulphuric acid corresponding to their moisture content, but also to maintain the cooling medium at its point of entry into the heat transfer system, and at all points in the system adjacent heat transfer surfaces, above this condensation temperature. This procedure eliminates entirely the condensation of acid at all points. To carry out this improved process in the most efficient manner I have devised the apparatus described herein, in which the inlet temperature of the cooling medium may be maintained at a definite value without the use of auxiliary preheaters and without added fuel cost.

The operation of the apparatus which I have devised as a means of carrying out my improved process is as follows: Gas is introduced through the inlet 20 into the column and flows successively through the compartments B, E, C, F and D. The blower 29 is put in operation, the shutter 35 and damper 36 being closed so that the air will circulate in a closed path through the heat transferrers E and F until the temperature of the air is raised to the desired temperature. If the temperature tends to rise further the shutter 35 is opened to admit cold air and thereby maintain the temperature between the desired limits, it being understood that the damper 38 controlling the purge pipe 37 is also opened to discharge the excess air.

During the operation, the shutter 35 and damper 38 are manipulated as required to control the temperature of the air, while the dampers 33 for the bustle pipes for each of the heat transferrers E and F may also be regulated as required to control the volume of air passing through each compartment.

It will be seen that when operating in accordance with my invention, as the temperature of the cooling medium used is lowered more than has been thought possible heretofore, a consequently smaller quantity of cooling medium is required for the abstraction of the given amount of heat. This results in lower operating costs and in lowered cost of equipment for the initial installation. A much more efficient control of the heat transfer operation becomes possible because the temperature differential existent between the hot gases and the cooling medium is consequently greater than in prior practice.

It is of course obvious that my invention is applicable to the use of cooling mediums other than air, as for instance in those systems in which the $SO_2$ gases are preheated to the temperature required for conversion by passage through heat transferrers in heat transfer relation to the hot gases issuing from the conversion stages. In this case the $SO_2$ gas after being heated in the heat transferrers would not be discharged to the atmosphere, as when using air but would be passed to the converters.

While I have illustrated in the accompanying drawings a preferred form of apparatus for carrying out my invention in connection with a multi-stage converter system, in which close control of temperature conditions is essential, and in which corrosion is highly deleterious not only to the heat transfer apparatus but also to the catalyst used in the conversion stages, it is of course clear that my invention is not confined to this particular use but is of value in connection with regulating temperature conditions and the treatment of gases containing sulphur trioxide generally.

While I have shown the inlet and outlet pipes connecting with the transferrers as terminating in bustles, it will be understood that the invention is not limited to the use of such bustle pipes. It will also be understood various other changes and modifications may be resorted to without departing from the spirit of my invention.

The expression "initial temperature" as used in the claims means the temperature of the cooling medium at the points where it first contacts with heat transferring surfaces which have sulphur trioxide containing gases also in contact therewith.

I claim:

1. The process of cooling gases containing sulphur trioxide and moisture which consists in passing said gases in heat transfer relation to a cooling medium at a temperature substantially below 400° F. and above the condensation temperature of sulphuric acid which corresponds to the moisture content of the gases to be cooled, and maintaining the moisture content of said gases below about 0.5 gms. of moisture per cu. ft.

2. The process of cooling gases containing sulphur trioxide and moisture which consists in passing said gases through a heat transfer system through which a cooling medium is passed, maintaining the temperature of said cooling medium at its point of entry into the heat transferrers below 400° F. and above the condensation temperature of sulphuric acid corresponding to the moisture content of the gases, and maintaining the moisture content of said gases below about 0.5 gms. of moisture per cu. ft.

3. The process of cooling gases containing sulphur trioxide and moisture which consists in subjecting the gases undergoing treatment to the cooling action of a cooling medium having a temperature between about 200° F. and 400° F. at the point at which the cooling action of said cooling medium on said gases first takes place, and maintaining the moisture content of said gases below about 0.1 grams of moisture per cubic foot.

4. The process of cooling gases containing sulphur trioxide and less than approximately .5 gram of moisture per cu. ft., said gases containing an excess of sulfur trioxide with respect to their moisture content which consists in subjecting said gases to the cooling action of a cooling medium having a temperature below 400° F. and above the condensation temperature of sulphuric acid corresponding to the moisture content of said gases.

5. In a process for the catalytic oxidation of sulphur dioxide in successive stages that step which consists in subjecting the gases undergoing treatment intermediate the conversion stages to the cooling action of a cooling medium having an initial temperature below 400° F. and above that temperature which will result in condensation of sulphuric acid from the gases, and maintaining the moisture content of said gases below about 0.1 grams of moisture per cubic foot.

6. The process of cooling gases containing sulphur trioxide and less than approximately .5 grams of moisture per cubic foot, which consists in subjecting said gases to the cooling action of a cooling medium, and utilizing the heat of said gases to increase the initial temperature of the cooling medium to a point below 400° F. and above the condensation temperature of sulphuric acid from the gases undergoing treatment.

7. The process of cooling gases containing sulphur trioxide and moisture which consists in subjecting said gases to the cooling action of air, and utilizing the heat of said gases to increase the initial temperature of the air to a point above the condensation temperature of sulphuric acid from the gases undergoing treatment, by returning the heated air into heat transfer relationship with the entering air.

8. The process of cooling gases containing sulphur trioxide and moisture which consists in subjecting said gases to the cooling action of a cooling medium, and maintaining the initial temperature of said cooling medium below 400° F. and above the condensation temperature of sulphuric acid from the gases undergoing treatment by the admixture of a sufficient portion of the hot cooling medium with the entering cooling medium.

9. The process of producing sulphur trioxide from a gas mixture comprising sulphur dioxide and oxygen and less than approximately .5 grams of moisture per cubic foot, which consists in subjecting said gas to catalytic action in successive stages, and cooling the gases between successive stages containing an excess of sulfur trioxide with respect to their moisture content by means of a cooling medium having an initial temperature below 400° F. and above that temperature which will result in condensation of sulphuric acid from the gases undergoing treatment.

10. The process of cooling gases containing sulphur trioxide and moisture which consists in subjecting said gases to the cooling action of air and maintaining the initial temperature of said air above the condensation temperature of sulphuric acid from the gases undergoing treatment by permitting the escape of part of the heated air while mixing another portion of the heated air with the entering air.

11. The process of dry cooling gas containing sulfur trioxide and moisture by transferring heat from said gas through a heat transfer wall into a cooling medium, which comprises maintaining the temperature of said cooling medium adjacent said wall below 400° F. and above that temperature which will result in condensation of sulfuric acid from said gas, and maintaining the moisture content of said gases below about 0.1 grams of moisture per cubic foot.

12. The process of cooling gases containing sulfur trioxide and moisture, which consists in passing said gases in heat transfer relation to a cooling medium at a temperature between about 200° F. and 300° F. and above the condensation temperature of sulfuric acid which corresponds to the moisture content of the gases to be cooled, and maintaining the moisture content of said gases between about 0.001 and 0.1 gms. per cu. ft.

In testimony whereof, I affix my signature.

LOWRY GILLETT.